（12）United States Patent
Solberg

(10) Patent No.: US 11,931,807 B2
(45) Date of Patent: Mar. 19, 2024

(54) LIQUID EJECTOR HAVING INTERNAL PISTON AND METHODS THEREOF

(71) Applicant: XEROX CORPORATION, Norwalk, CT (US)

(72) Inventor: Scott E. Solberg, San Jose, CA (US)

(73) Assignee: XEROX CORPORATION, Norwalk, CT (US)

( * ) Notice: Subject to any disclaimer, the term of this patent is extended or adjusted under 35 U.S.C. 154(b) by 246 days.

(21) Appl. No.: 17/246,915

(22) Filed: May 3, 2021

(65) Prior Publication Data
US 2022/0347756 A1   Nov. 3, 2022

(51) Int. Cl.
*B22F 12/53* (2021.01)
*B22F 10/22* (2021.01)
*B22F 12/10* (2021.01)
*B33Y 30/00* (2015.01)

(52) U.S. Cl.
CPC ............ *B22F 12/53* (2021.01); *B22F 10/22* (2021.01); *B22F 12/10* (2021.01); *B33Y 30/00* (2014.12)

(58) Field of Classification Search
CPC .......... B22F 12/53; B22F 12/10; B22F 10/22; B33Y 10/00; B33Y 30/00; B33Y 40/00
USPC ............... 266/236; 222/590, 581, 593, 596; 700/118, 119
See application file for complete search history.

(56) References Cited

U.S. PATENT DOCUMENTS

| | | | | |
|---|---|---|---|---|
| 4,102,610 A | * | 7/1978 | Taboada | H02K 33/02 318/128 |
| 4,928,933 A | * | 5/1990 | Motomura | B22D 39/003 266/94 |
| 5,009,399 A | * | 4/1991 | Bykhovsky | H02K 44/04 266/237 |
| 6,182,908 B1 | * | 2/2001 | Hamilton | B05B 1/3053 239/125 |

(Continued)

FOREIGN PATENT DOCUMENTS

DE   102017222233   *   6/2019   ............ B33Y 10/00

OTHER PUBLICATIONS

Cormier et al., "Building an Object with a Three-Dimensional Printer Using Vibrational Energy," U.S. Appl. No. 17/144,910, filed Jan. 8, 2021.

*Primary Examiner* — Jessee R Roe
*Assistant Examiner* — Michael Aboagye
(74) *Attorney, Agent, or Firm* — MH2 Technology Law Group LLP

(57) ABSTRACT

An ejector for a printing system is disclosed. The ejector body may include an internal cavity, a nozzle in communication with the internal cavity, one or more segmented solenoid coils wrapped at least partially around the ejector body, and a piston disposed within the internal cavity of the ejector body. A method of ejecting liquid from an ejector is also disclosed, including introducing a material for ejection into an ejector cavity. The method of ejecting liquid from an ejector may include advancing a piston configured for translational motion within an ejector towards an ejector nozzle which may further include de-energizing a first segment of a segmented solenoid wrapped partially around the ejector, energizing a second solenoid segment of a segmented solenoid wrapped partially around the ejector. The method of ejecting liquid from an ejector may also (Continued)

include ejecting a drop of the material for ejection from the ejector nozzle.

17 Claims, 12 Drawing Sheets

(56) References Cited

U.S. PATENT DOCUMENTS

| | | | | |
|---|---|---|---|---|
| 8,899,450 | B2 * | 12/2014 | Johansson | F04B 13/00 |
| | | | | 222/375 |
| 10,870,149 | B2 * | 12/2020 | Oftedal | B29C 48/797 |
| 2013/0287934 | A1 * | 10/2013 | Ramsundar | B22F 10/25 |
| | | | | 427/256 |

* cited by examiner

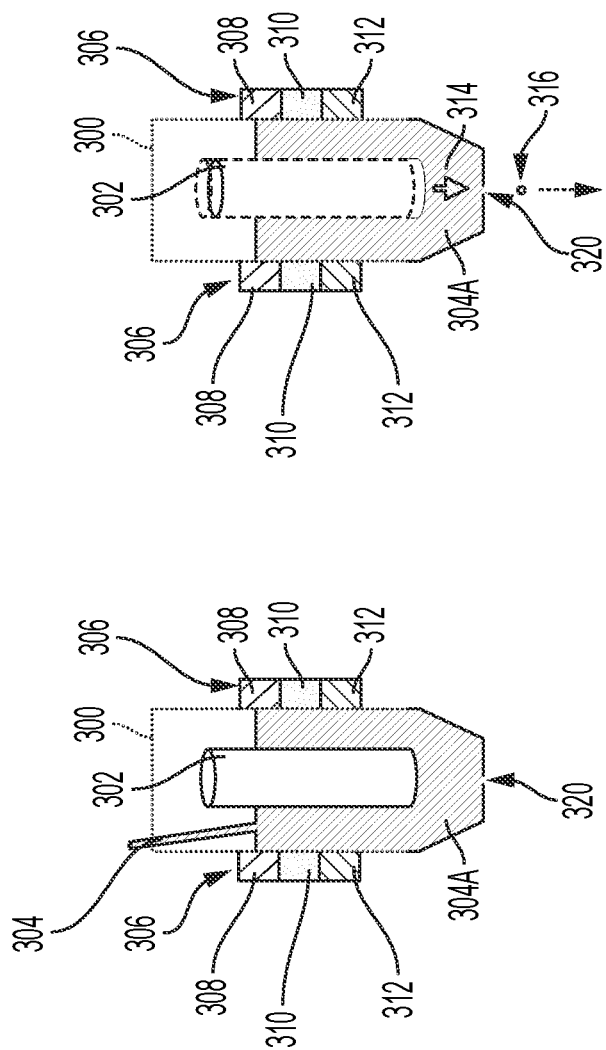

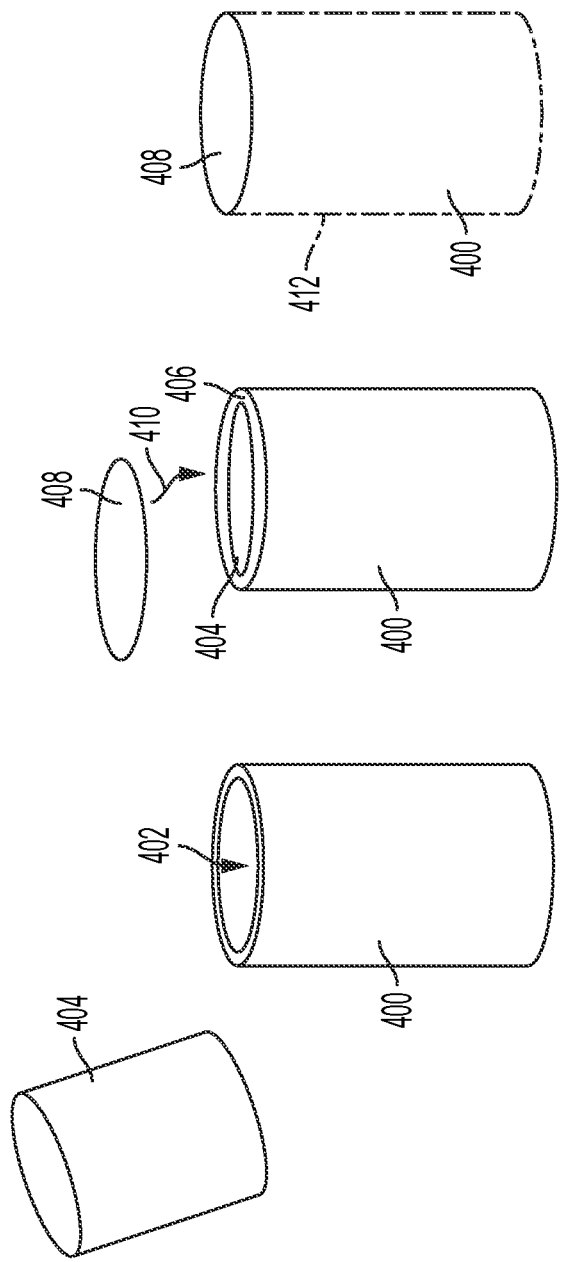

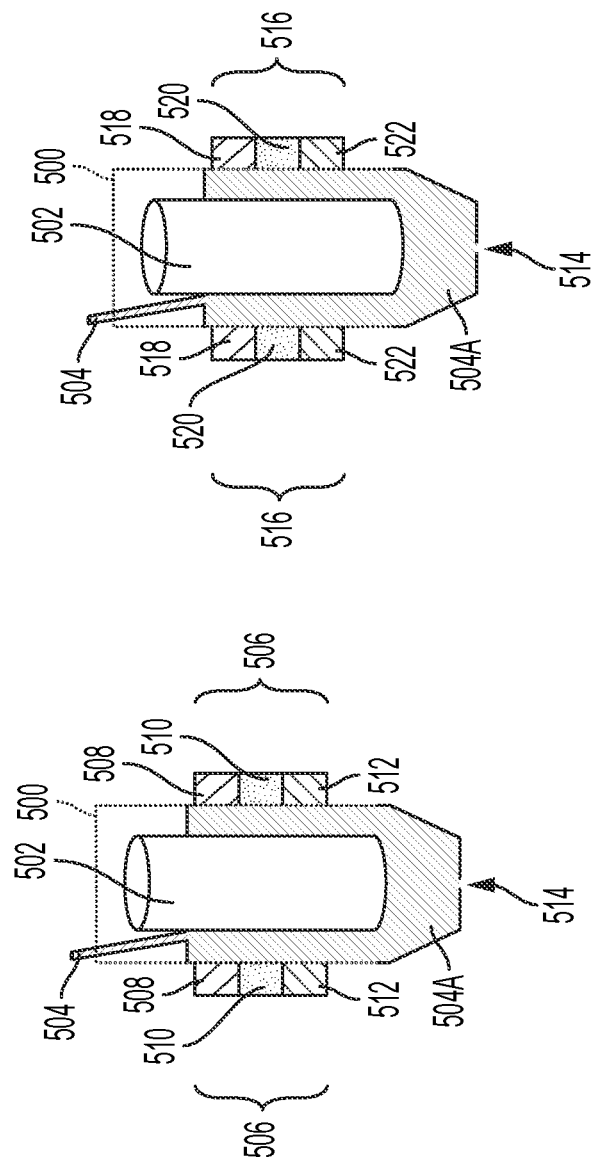

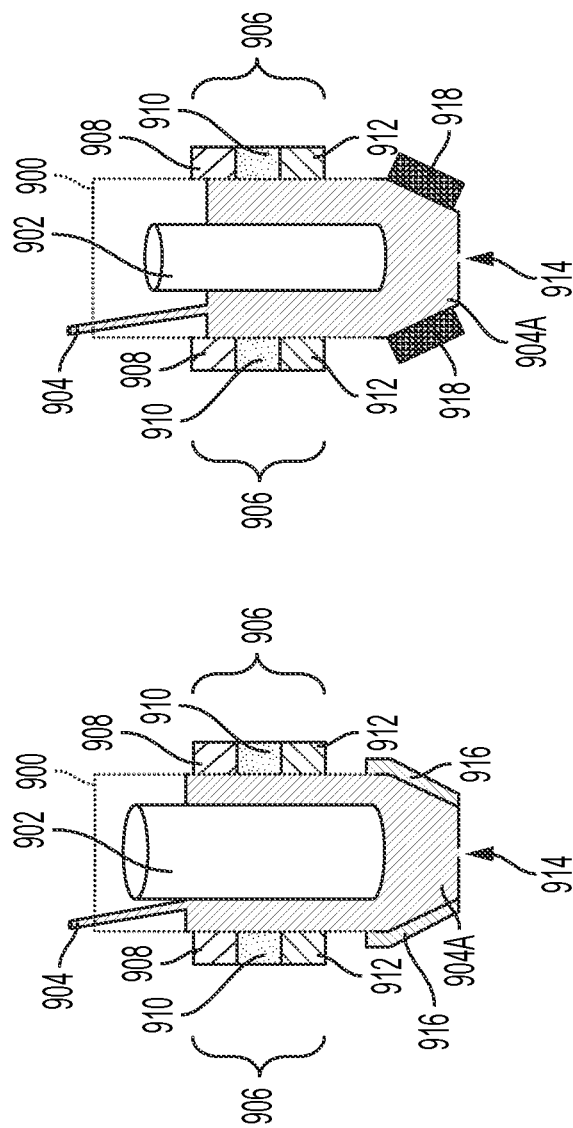

LIQUID EJECTOR HAVING INTERNAL PISTON AND METHODS THEREOF

TECHNICAL FIELD

The present teachings relate generally to drop-on-demand (DOD) printing and, more particularly, to liquid ejectors for use within a DOD printer.

BACKGROUND

A drop-on-demand (DOD) or three-dimensional (3D) printer builds (e.g., prints) a 3D object from a computer-aided design (CAD) model, usually by successively depositing material layer upon layer. For example, a first layer may be deposited upon a substrate, and then a second layer may be deposited upon the first layer. One particular type of 3D printer is a magnetohydrodynamic (MHD) printer, which is suitable for jetting liquid metal layer upon layer to form a 3D metallic object. Magnetohydrodynamic refers to the study of the magnetic properties and the behavior of electrically conducting fluids.

In MHD printing, a liquid metal is jetted out through a nozzle of the 3D printer onto a substrate or onto a previously deposited layer of metal. When printing liquid metals via MHD printing, large currents of up to 800 amps may be needed to induce sufficient circulating current in the liquid metal to create a large enough Lorentz force to pressurize the liquid for ejection. Wires sufficiently large to carry such currents take up valuable space near the ejector vessel, thus inhibiting miniaturization. Thus, a method of and apparatus for liquid ejection is needed to provide a lower power ejection source for liquid printing materials that can be scalable by size without prohibitive heating elements.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

An ejector for a printing system is disclosed. The ejector body may include an internal cavity, a nozzle in communication with the internal cavity, one or more segmented solenoid coils wrapped at least partially around the ejector body, and a piston disposed within the internal cavity of the ejector body.

Other implementations may include a piston that is cylindrical. The piston may include a ferromagnetic portion and a non-ferromagnetic portion. The ejector may include a core disposed within the piston, configured to interact with the one or more segmented solenoid coils. The one or more segmented solenoid coils can be configured to translate the piston towards the nozzle. The one or more segmented solenoid coils can be configured to translate the piston away from the nozzle. A diameter of the core may be smaller than a diameter of the piston. A length of the core may be smaller than a length of the piston. The core may also include a ferromagnetic material. The ejector may include a heating element configured to heat a solid in the ejector, thereby causing the solid to change to a liquid within the ejector. The ejector may include a power source configured to supply one or more pulses of power to the one or more segmented solenoid coils, which can cause one or more drops of the liquid to be jetted out of the nozzle. The one or more segmented solenoid coils may include two or more segments capable of being energized or de-energized independently to cause bi-directional travel of the piston within the ejector. The one or more segmented solenoid coils may include three segmented coils. The one or more segmented solenoid coils may be configured to independently power on and/or power off. The ejector includes no mechanical return mechanism. A diameter of the piston may be smaller than a diameter of the internal cavity of the ejector body. The piston may include a surface coating of a continuous ceramic material disposed over an external surface of the piston. The piston may also include an inert surface coating on the continuous ceramic material, where the surface coating is inert while in contact with a printing material. The ejector includes no seals or guides.

A method of ejecting liquid from an ejector is also disclosed. The method of ejecting liquid from an ejector also includes introducing a material for ejection into an ejector cavity. The method of ejecting liquid from an ejector may include advancing a piston configured for translational motion within an ejector towards an ejector nozzle which may further include de-energizing a first segment of a segmented solenoid wrapped partially around the ejector, energizing a second solenoid segment of a segmented solenoid wrapped partially around the ejector. The method of ejecting liquid from an ejector may also include ejecting a drop of the material for ejection from the ejector nozzle.

The disclosed method of ejecting liquid from an ejector may include retracting the piston away from the ejector nozzle which may include: energizing a first segment of a segmented solenoid wrapped partially around the ejector; and de-energizing a second solenoid segment of a segmented solenoid wrapped partially around the ejector. Advancing the piston may also include producing a magnetic field using the segmented solenoid. Retracting the piston may include producing a magnetic field using the segmented solenoid. The material for ejection may be liquid at a temperature of about 25° C. The material for ejection further may be a petroleum-based fluid. The method of ejecting liquid from an ejector may include driving the segmented solenoid with a programmable pulse-width-modulator. The method of ejecting liquid from an ejector may include measuring a displacement of the piston with a laser displacement measurement device. The method of ejecting liquid from an ejector may include heating the ejector with a resistance heating source wrapped at least partially around an ejector body. The method of ejecting liquid from an ejector may include heating the ejector with a high-frequency inductance heating source wrapped at least partially around an ejector body.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 3A-3C are side cross-sectional views of a liquid ejector, illustrating operation of the liquid ejector, according to an embodiment.

FIGS. 4A-4C are a series of perspective views illustrating fabrication of a piston for use in a liquid ejector, according to an embodiment.

FIGS. 5A-5C are side cross-sectional views of several liquid ejectors, each having various solenoids, according to embodiments.

FIGS. 9A-9B are side cross-sectional views of a liquid ejector, each having various material heating configurations, according to embodiments.

DETAILED DESCRIPTION

Figure 1:
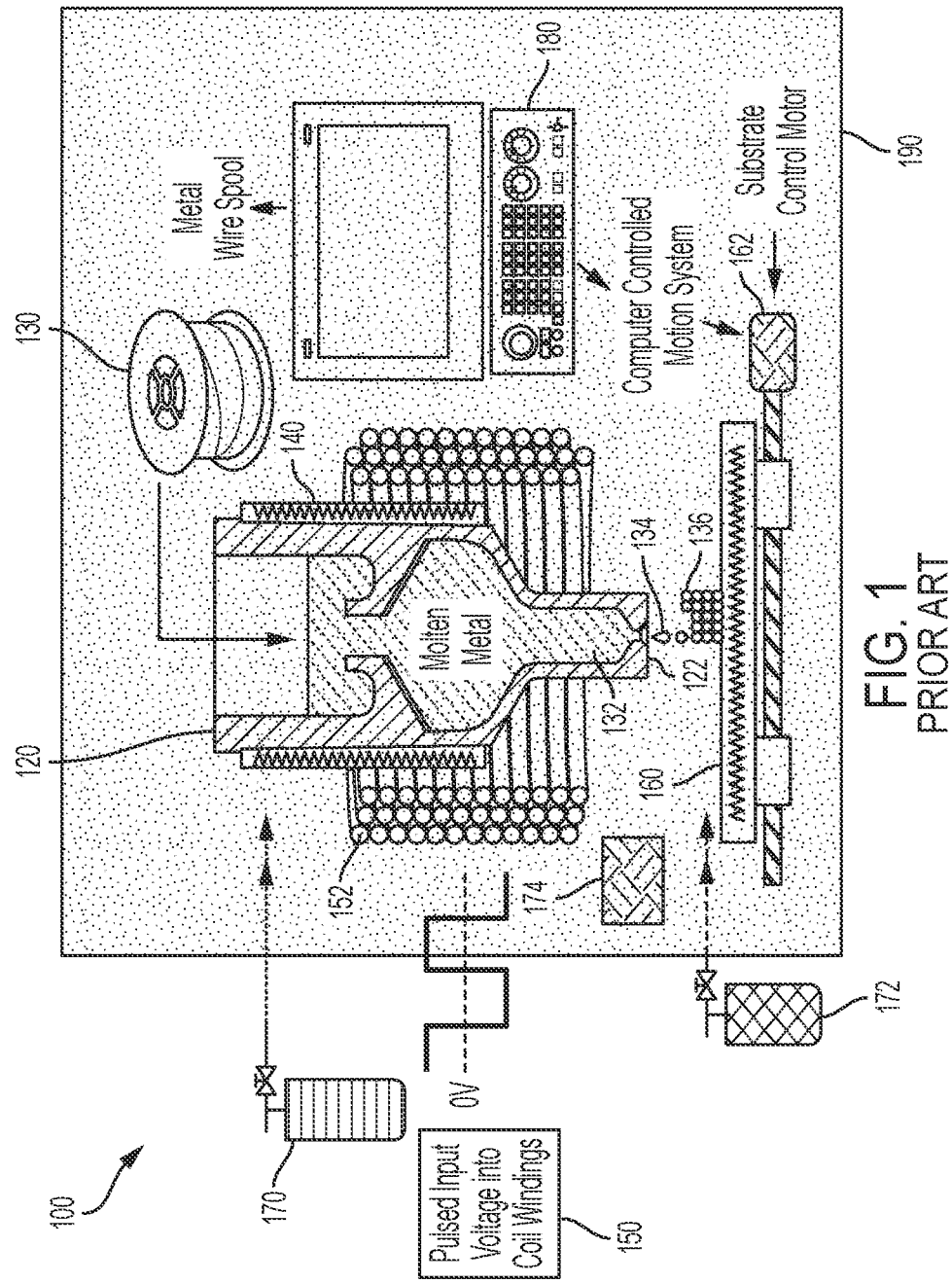
FIG. 1 depicts a schematic cross-sectional view of a 3D printer (e.g., a MHD printer and/or multi-jet printer), according to an embodiment.

Reference will now be made in detail to exemplary embodiments of the present teachings, examples of which are illustrated in the accompanying drawings. Wherever possible, the same reference numbers will be used throughout the drawings to refer to the same, similar, or like parts.

Drop-on-demand (DOD) or three-dimensional (3D) printers known in the art require the switching of large currents up to 800 amps and very strong (>1 Tesla) magnetic fields to induce enough circulating current in the molten metal to create a sufficiently large Lorentz force to pressurize the liquid for ejection. Wires and electrical apparatus sufficiently large to carry such currents to generate magnetic fields of such magnitude take up valuable space near the ejector vessel, thus inhibiting miniaturization and requiring large operating power.

Disclosed herein is an ejector or ejection source for a printing system, having an ejector body comprising a nozzle. The method of ejection for the ejector includes one or more segmented solenoid coils wrapped at least partially around the ejector body, and a cylindrical piston disposed within the ejector body and capable of translational motion. The cylindrical piston may include a ferromagnetic core disposed within the piston, configured to interact with the one or more segmented solenoid coils in a manner that translates the cylindrical piston away from or towards the nozzle when each respective segment of the segmented solenoid coils are independently powered on and/or powered off. The ejector may include additional heating elements, either to heat a solid held within the ejector such that it will change to a liquid, or to maintain a melting temperature corresponding to the printing material being used in the ejector. A power source configured to supply one or more pulses of power to the one or more segmented solenoid coils, which cause one or more drops of the liquid to be jetted out of the nozzle is also included in the ejector. The segmented solenoid coils in the ejector enable low power, currents of as low as 15 amps, translation of the cylindrical piston, and eliminate the need for a mechanical return mechanism during operation. Known solenoid actuators used in valves and pumps typically use a mechanical return spring for moving a piston in an opposite direction as the solenoid pulling force. Inside harsh environments, such as vessels or ejector bodies with molten metals, or perhaps extremely corrosive liquids, such return springs would be difficult to make both effective and durable with known materials and methods. A segmented solenoid coil refers to a solenoid coil which has discrete, independent segments that are configured to be switched on and/or switched off independently from one another. Power can be directed independently to each independent segment to energize or power on a segment. Likewise, power can be removed independently from each independent segments to de-energize or power off a segment.

The use of multiple coils around an ejector body having a piston configured for translational motion permits moving the piston in both directions by switching the current on or off in the various coils. Such a multi-segment solenoid may be suitable for harsh environments and at a frequency suitable and configured for drop-on-demand printing. With the appropriate selection of coil driving pulses, such an ejector would be enabled to pressurize the liquid between a piston and a nozzle to eject liquid. Further, it should be possible to optimize retraction to allow liquid to flow past the piston to replenish liquid which was previously ejected without cavitation.

By utilizing an apparatus to eject liquids using an internal piston without a spring return and without seals, and having a ferromagnetic material with a high (1040° C.) Curie temperature, a Co0.92Fe0.08 alloy for example, in the core of a piston, a solenoid coil may be used to move the piston in the ejector to physically displace many useful molten metals for ejection, as well as other liquid printing materials. The piston would have a core of ferromagnetic material, embedded in or coated with inert material to resist environmental degradation of the core from the printing material. In certain embodiments, multiple solenoid coil segments may be independently turned on (energized) or off (de-energized), it enables extension and retraction of the piston without requiring a mechanical return spring as used with traditional single-coil solenoid actuators.

According to embodiments described herein, the use of an internal piston provides a manner of moving the piston freely in a printing material liquid without requiring dynamic seals, as such seals would be difficult to make both effective and durable in vessels containing harsh liquids at high temperatures. In embodiments, suitable printing material liquids may include any harsh liquids that are not easily ejected using known liquid ejector methods typically used with molten metals, corrosive chemicals, molten dielectric materials, and other printing materials requiring ejection at higher temperatures. Furthermore, any printing material liquids could be used which having sufficiently low viscosity for drop ejection as known in the art, as low as or lower than 10 centiPoise. Other printing material liquids that would freeze or solidify upon contact with the target may be used for building 3D structures. In certain embodiments, 2D drop-on-demand printing applications, the liquid need not freeze or solidify, enabling applications requiring filling of micro-wells with harsh liquids, for example. Certain embodiments may include jetting or ejection of liquids such as petroleum-based fuels or hydrocarbon fuels, oils, or lubricants, examples including gasoline, kerosene, motor oils, diesel fuel, or combinations thereof. Still other embodiments may include jetting or ejection of fluids such as coolants or heat transfer fluids, such as, for example, water, deionized water, heavy water, ethylene glycol, propylene glycol, polyalkylene glycol, silicone oils, fluorocarbon oils, cutting fluids, mineral oil, food based oils such as castor oil, olive oil, canola oil, vegetable oil, avocado oil, tree-nut based oils, or combinations thereof. Also disclosed herein is a method to eject liquid from an ejector including melting a printing material within an ejector to form a liquid printing material, actuating a segmented solenoid configured to interact with a piston held within the ejector, and thereby moving the piston towards an ejector nozzle defined by the ejector to eject a drop of liquid printing material from the ejector nozzle without the use of a return spring, internal seals, or other complex mechanical implementations. Such a method and ejector may be readily configured for use in a drop-on demand printing system, a continuous use printing system, or in the delivery of various chemicals or liquid chemicals or materials which may not be suitable for other methods of printing known in the art.

FIG. 1 depicts a schematic cross-sectional view of a type of drop-on-demand (DOD) or three-dimensional (3D) printer 100, according to an embodiment. The 3D printer 100 may include an ejector (also referred to as a body or pump chamber) 120. The ejector 120 may define an inner volume (also referred to as an internal cavity). A printing material 130 may be introduced into the inner volume of the ejector 120. The printing material 130 may be or include a metal, a polymer, or the like. For example, the printing material 130 may be or include aluminum or aluminum alloy (e.g., a spool of aluminum wire). Further details related to the internal components and mechanisms within the ejector 120 will be described later. The 3D printer 100 may also include one or more heating elements 140. The heating elements 140 are configured to melt the printing material 130, thereby converting the printing material 130 from a solid state to a liquid state (e.g., liquid metal 132) within the inner volume of the ejector 120.

The 3D printer 100 may also include a power source 150 and one or more metallic coils 152 that are wrapped at least partially around the ejector 120. The power source 150 may be coupled to the coils 152 and configured to provide an electrical current to the coils 152. In one embodiment, the power source 150 may be configured to provide a step function direct current (DC) voltage profile (e.g., voltage pulses) to the coils 152, which may create an increasing magnetic field. The increasing magnetic field may cause an electromotive force within the ejector 120, that in turn causes an induced electrical current in the liquid metal 132. The magnetic field and the induced electrical current in the liquid metal 132 may create a radially inward force on the liquid metal 132, known as a Lorenz force. The Lorenz force creates a pressure at an inlet of a nozzle 122 of the ejector 120. The pressure causes the liquid metal 132 to be jetted through the nozzle 122 in the form of one or more liquid drops 134. Alternate embodiments as described herein may eliminate or reconfigure the power source 150, coils 152, and method of ejection by Lorenz force in favor of an alternate ejection method and apparatus, as described herein.

The 3D printer 100 may also include a substrate 160 that is positioned proximate to (e.g., below) the nozzle 122. The drops 134 may land on the substrate 160 and solidify to produce a 3D object 136. In one example, the 3D object 136 may be or include a strut, which may be part of a lattice structure, or various layers as integral elements of a larger structure. The 3D printer 100 may also include a substrate control motor 162 that is configured to move the substrate 160 while the drops 134 are being jetted through the nozzle 122, or during pauses between when the drops 134 are being jetted through the nozzle 122, to cause the 3D object 136 to have the desired shape and size. The substrate control motor 162 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 120 and/or the nozzle 122 may be also or instead be configured to move in one, two, or three dimensions. In other words, the substrate 160 may be moved under a stationary nozzle 122, or the nozzle 122 may be moved above a stationary substrate 160. In yet another embodiment, there may be relative rotation between the nozzle 122 and the substrate 160 around one or two additional axes, such that there is four or five axis position control. In certain embodiments, both the nozzle 122 and the substrate 160 may move. For example, the substrate 160 may move in X and Y directions, while the nozzle 122 moves up and/or down in a Y direction.

The 3D printer 100 may also include one or more gas-controlling devices, which may be or include gas sources (two are shown: 170, 172). The first gas source 170 may be configured to introduce a first gas. The first gas may be or include an inert gas, such as helium, neon, argon, krypton, and/or xenon. In another embodiment, the first gas may be or include nitrogen. The first gas may include less than about 10% oxygen, less than about 5% oxygen, or less than about 1% oxygen.

In at least one embodiment, the first gas may be introduced at a location that is above where the second gas is introduced. For example, the first gas may be introduced at a location that is above the nozzle 122 and/or the coils 152. This may allow the first gas (e.g., argon) to form a shroud/sheath around the nozzle 122, the drops 134, the 3D object 136, and/or the substrate 160 to reduce/prevent the formation of oxide (e.g., aluminum oxide). Controlling the temperature of the first gas may also or instead help to control (e.g., minimize) the rate that the oxide formation.

The second gas source 172 may be configured to introduce a second gas. The second gas may be different than the first gas. The second gas may be or include oxygen, water vapor, carbon dioxide, nitrous oxide, ozone, methanol, ethanol, propanol, or a combination thereof. The second gas may include less than about 10% inert gas and/or nitrogen, less than about 5% inert gas and/or nitrogen, or less than about 1% inert gas and/or nitrogen. The second gas may be introduced at a location that is below the nozzle 122 and/or the coils 152. For example, the second gas may be introduced at a level that is between the nozzle 122 and the substrate 160. The second gas may be directed toward the nozzle 122, the falling drops 134, the 3D object 136, the substrate 160, or a combination thereof. This may help to control the properties (e.g., contact angle, flow, coalescence, and/or solidification) of the drops 134 and/or the 3D object 136.

The 3D printer 100 may also include another gas-controlling device, which may be or include a gas sensor 174. The gas sensor 174 may be configured to measure a concentration of the first gas, the second gas, or both. More particularly, the gas sensor 174 may be configured to measure the concentration proximate to the nozzle 122, the falling drops 134, the 3D object 136, the substrate 160, or a combination thereof. As used herein, "proximate to" refers to within about 10 cm, within about 5 cm, or within about 1 cm.

The 3D printer 100 may also include a computing system 180. The computing system 180 may be configured to control the printing of the 3D object 136. More particularly, the computing system 180 may be configured to control the introduction of the printing material 130 into the ejector 120, the heating elements 140, the power source 150, the substrate control motor 162, the first gas source 170, the second gas source 172, the gas sensor 174, or a combination thereof. As discussed in greater detail below, in one embodiment, the computing system 180 may control the rate at which the voltage pulses are provided from the power source 150 to the coils 152, and thus the corresponding rate at which the drops 134 are jetted through the nozzle 122. These two rates may be substantially the same.

In another embodiment, the computing system 180 may be configured to receive the measurements from the gas sensor 174, and also configured to control the first gas source 170 and/or the second gas source 172, based at least partially upon the measurements from the gas sensor 174, to obtain the desired gas concentration around the drops 134 and/or the object 136. In at least one embodiment, the concentration of the first gas (e.g., nitrogen) may be maintained between about 65% and about 99.999%, between about 65% and about 75%, between about 75% and about 85%, between about 85% and about 95%, or between about 95% and about 99.999%. In at least one embodiment, the concentration of the second gas (e.g., oxygen) may be maintained between about 0.000006% and about 35%, between about 0.000006% and about 0.00001%, between about 0.00001% and about 0.0001%, between about 0.0001% and about 0.001%, between about 0.001% and about 0.01%, between about 0.01% and about 0.1%, between about 0.1% and about 1%, between about 1% and about 10%, or between about 10% and about 35%.

The 3D printer 100 may also include an enclosure 190 that defines an inner volume (also referred to as an atmosphere). In one embodiment, the enclosure 110 may be hermetically sealed. In another embodiment, the enclosure 110 may not be hermetically sealed. In one embodiment, the ejector 120, the heating elements 140, the power source 150, the coils 152, the substrate 160, the computing system 180, the first gas source 170, the second gas source 182, the gas sensor 184, or a combination thereof may be positioned at least partially within the enclosure 190. In another embodiment, the ejector 120, the heating elements 140, the power source 150, the coils 152, the substrate 160, the computing system 180, the first gas source 170, the second gas source 182, the gas sensor 184, or a combination thereof may be positioned at least partially outside of the enclosure 190.

Figure 2A:
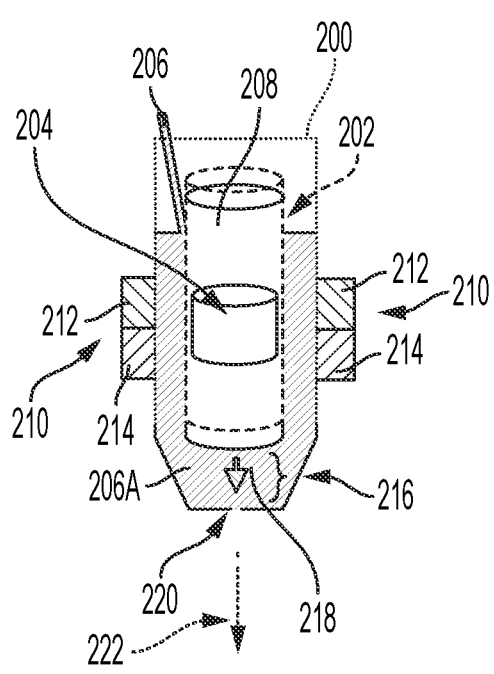
FIGS. 2A-2B are side cross-sectional views of liquid ejectors, according to embodiments.
Figure 2B:
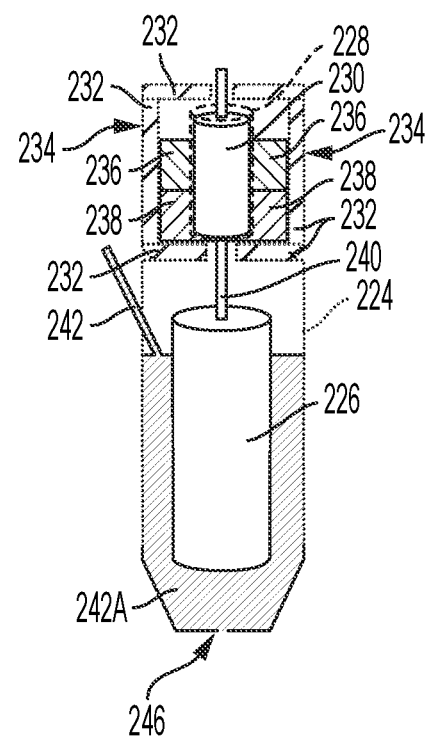

FIGS. 2A-2B are side cross-sectional views of liquid ejectors, according to embodiments. FIG. 2A illustrates a liquid ejector 200 that defines an ejector body having an outline of a piston travel area 202, within which a piston 208 is capable of translational motion. A wire feed of printing material 206 enters the liquid ejector 200 for the purpose of introducing printing material into the body of the liquid ejector 200. The printing material 206 is melted in order to change the printing material 206 into a liquid printing material 206A, which is at a low enough viscosity to be ejected by the liquid ejector 200. The piston 208 also includes an internal ferromagnetic core 204, and the liquid ejector 200 further includes one or more segmented solenoid coils 210 wrapped at least partially around the liquid ejector 200. Each segmented solenoid 210 defines a first solenoid coil segment 212 and a second solenoid coil segment 214, which interact with this internal ferromagnetic core 204 inside the piston 208. FIG. 2A illustrates a non-switched first solenoid coil segment 212 and a switched second solenoid coil segment 214 on either side of the liquid ejector 200. As each segment 212, 214 of the segmented solenoid 210 is switched on, the internal ferromagnetic core 204 within the piston 208 is attracted to the switched on solenoid segment, thereby moving the piston 208 in a direction towards the switched on solenoid segment 212, 214 and away from the switched off solenoid segment 212, 214. When the switching of the segmented solenoid 210 occurs in rapid succession, the piston 208 may move translationally towards and away from an ejector orifice 220 defined by the liquid ejector 200 and create a pulse within a transient pressure pulse ejector area 216 inside the body of the liquid ejector 200. This pulsing motion results in an ejected droplet 222 of the liquid printing material 206A from the nozzle or ejector orifice 220 of the liquid ejector 200. The nozzle or ejector orifice 220 is in communication with a cavity defined by a body of the ejector 200. Certain embodiments of liquid ejectors may include one or more segmented solenoid coils, with each segmented solenoid coil having two or more segmented coils, two or more segments, up to and including as many as twenty segments within the one or more segmented solenoid coils.

Embodiments having such a manner of operation for a liquid ejector 200 provides utility under very high temperature operating conditions. This liquid ejector 200 design requires no dynamic seal as the piston is internal to the heated vessel or ejector body. Also, no return spring is required as is the case for conventional solenoid pumps utilizing a solenoid switching mechanism. The use of segmented coils 212, 214 providing bi-directional piston 208 motion or bi-directional travel without requiring a spring as in conventional solenoid actuators reduces the number of parts and the complexity of the liquid ejector 200. The high temperatures required for effectively ejecting molten metal alloys or other printing materials such as copper, iron, nickel, and their alloys, having high melting temperatures is also fairly harsh relative to the longevity and service life of additional internal mechanical components like spring or other return mechanisms known in conventional solenoid pumping systems. A liquid ejector 200 having such a piston 208 and switching mechanism may allow the piston 208 to move along a longitudinal axis within the cavity of the ejector in any liquid, including dielectrics, which may include the use of a room temperature liquid or printing material in certain embodiments. A ferromagnetic core further allows for efficient operation and may require as little as $\frac{1}{50}^{th}$ the electrical current to energize the coil to pressurize molten material as compared to existing ejectors known in the art. Known ejectors rely on a very strong (>1 Tesla) magnetic field to directly displace molten metal, and since some metals or metal alloys, aluminum alloys, for example, are only weakly affected by magnetic field, the power requirements for these ejectors can be rather high. While particular lengths of internal ferromagnetic core 204 and piston 208 are shown, it should be noted that limiting ferromagnetic core length relative to the piston in certain embodiments may reduce inductance of switching coil, resulting in faster response to solenoid switching. Example materials which could be ejected using a liquid ejector according to embodiments described herein also include alloys of aluminum, brasses, naval brass, and bronzes. Silver and alloys thereof, copper and alloys thereof, metallic alloys, braze alloys, dielectric materials, glass, or combinations thereof may also be printed using liquid ejectors according to embodiments herein. Certain embodiments may include various sources of heating elements, configured to directly or indirectly heat the ejector or the printing materials held within the ejector.

FIG. 2B illustrates another embodiment of a liquid ejector 224 that defines an ejector body having a cavity within which a piston 226 is capable of translational motion along a longitudinal axis defined by the cylindrical form of the liquid ejector 224. A wire feed of printing material 242 enters the liquid ejector 224 for the purpose of introducing printing material into the body of the liquid ejector 224. The printing material 242 may be melted in order to change the printing material 242 into a liquid printing material 242A, which is at a low enough viscosity to be ejected by the liquid ejector 224. The liquid ejector 224 also defines a nozzle or ejector orifice 246. The piston 226 also has a ferromagnetic portion 230 attached thereto by an attachment means 240. The attachment means may be a shaft, a stiff wire, or other means of connecting the ferromagnetic portion 230 to the piston 226. The ferromagnetic portion 230 is contained within a ferromagnetic portion housing 228 to shield the internal ferromagnetic material of the ferromagnetic portion 230 from any harsh printing materials or environmental conditions. The remainder of the piston 226 may be non-ferromagnetic in certain embodiments. Disposed over an upper portion of the liquid ejector 224 are several magnetic pole pieces or segments 232 which may be incorporated into a housing or otherwise attached to the upper portion of the liquid ejector 224. Held in proximity to the magnetic pole segments 232 are one or more segmented solenoid coil 234 wrapped at least partially around the liquid ejector 224, each having a first solenoid coil segment 236 and a second solenoid coil segment 238. The embodiment of the numbers liquid ejector 224 illustrated in FIG. 2B has similar operating principles as described in regard to FIG. 2A, but in this embodiment the ferromagnetic portion 230 is located outside of the piston 226 and the one or more segmented solenoid coils 234 are located above the liquid ejector 224. In such embodiments it may be necessary to minimize the electrical current fed to a coil, thus the incorporation of one or more magnetic pole pieces of high-temperature ferromagnetic material may be utilized to produce greater force for a given current. Certain embodiments may accommodate this by moving the ferromagnetic portion of the piston or ferromagnetic piston core up and out of the ejector body cavity relative the position shown in other embodiments described herein. An advantage of moving the ferromagnetic core in this orientation brings the ferromagnetic portion out of the printing material and in the case of high temperature or molten or molten metal printing materials, the ferromagnetic material could be slightly cooler than the printing material, thus allowing a lower Curie temperature material for the applied printing use or system or enabling higher melt temperatures for higher melting temperature metals or other printing materials to be ejected.

Figure 3C:
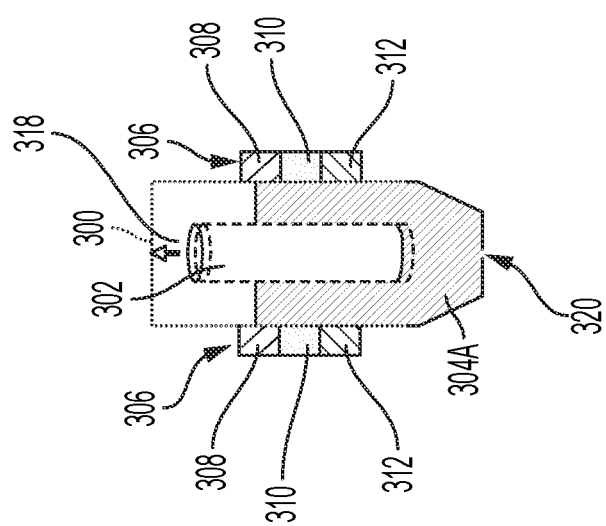

FIGS. 3A-3C are side cross-sectional views of a liquid ejector, illustrating operation of the liquid ejector, according to an embodiment. A liquid ejector 300 includes a translating piston 302, a wire feed of printing material 304 with the molten liquid printing material 304A contained therein, and a nozzle or ejector orifice 320, similar to the embodiment shown in FIG. 2A. The liquid ejector 300 of FIGS. 3A-3C includes two segmented solenoids 306 wrapped at least partially around the body of the liquid ejector 300. Each segmented solenoid 306 further defines three solenoid coil segments, a first solenoid coil segment 308, a second solenoid coil segment 310, and a third solenoid coil segment 312. In FIG. 3A, only the central or second solenoid coil segment 310 is energized or switched on, while the first solenoid coil segment 308 and the third solenoid coil segment 312 are not energized or switched off. With the central or second solenoid coil segment 310 energized, which draws the piston 302 to a neutral position within the liquid ejector 300. It should be noted that while the system is idle, with none of the solenoid coil segments 308, 310, 312 powered, the piston 302 may be allowed to sink or freely float within the liquid ejector 300. FIG. 3B shows the liquid ejector 300 with the first solenoid coil segment 308 of the segmented solenoid 306 turned off, and with the second solenoid coil segment 310 and the third solenoid coil segment 312 of the segmented solenoid 306 energized or switched on. This operative ejection switching of the segmented solenoid 306 drives the piston 302 towards the nozzle or ejector orifice 320 in direction 314, resulting in an ejected droplet 316. FIG. 3C illustrates the liquid ejector 300 with the first solenoid coil segment 308 and the second solenoid coil segment 310 of the segmented solenoid 306 turned on or energized, and with the third solenoid coil segment 312 of the segmented solenoid 306 switched off. This operative retraction switching of the segmented solenoid 306 drives the piston 302 away from the nozzle or ejector orifice 320 in direction 318, resulting in the piston 302 moving towards the center of the liquid ejector 300. At a high enough switching acceleration, sufficient pressure increase of the piston will eject a droplet of liquid or molten printing material 304A. Rapid retraction of the piston 302 should cause a little suck-back of printing material liquid 304A at the nozzle or ejector orifice 320. As an example, the resonant frequency of molten metal between piston and nozzle would typically be >100,000 Hz, so motion of piston should create pulses not standing waves, which are suitable for effective, defect-free molten ejection of liquid printing material 304A.

FIGS. 4A-4C are a series of perspective views illustrating fabrication of a piston for use in a liquid ejector, according to an embodiment. FIG. 4A illustrates a piston 400, having a hollow internal cavity 402. A ferromagnetic metal core 404 is placed inside the hollow internal cavity 402 of the ceramic, cylindrical piston 400. In one embodiment, a ceramic sealant 406 may be applied to a top portion of the piston 400 and a piston lid 408 may be placed in direction 410 and pressed onto the ceramic sealant 406 on the piston 400, thereby capturing and hermetically sealing the ferromagnetic metal core 404 within the hollow internal cavity 402 of the piston 400, as shown in FIG. 4B. In certain embodiments, an inert surface coating 412 may be applied to the external surface or outer surface of the cylindrical piston 400 to reduce interactions with the material comprising the piston 400, thus coating or treating the surface of the piston 400 either to adjust wetting with molten material or as a barrier to diffusion or degradation during operation of liquid ejectors according to one or more embodiments as described herein. Certain embodiments may have a cylindrical piston made from ceramics, metals, composite materials, or combinations thereof, as long as the material and inert coating is temperature resistant above an operating temperature of the ejector or melting or jetting temperature of the printing material. Alternatively, the piston may be fabricated from metals, alloys, or composite materials. Some implementations may incorporate a continuous ceramic material or continuous outer material to make up the composition of the piston. Certain embodiments may include a ferromagnetic core fabricated from a $Co_{0.92}Fe_{0.08}$ alloy, which has a Curie temperature of approximately 1040° C. Embodiments of ferromagnetic core materials may include commercially available magnetic alloys, such as Hiperco® 50 or Hiperco® 50A, and others, available from Ed Fagan, Inc., Franklin Lakes, NJ. According to some embodiments, the core may be fabricated using a powdered ferromagnetic material placed within the hollow internal cavity of the cylindrical pistons as compared to a solid core. In still other embodiments, the cylindrical piston may be fabricated from a ferromagnetic material and may also incorporate an inert coating to protect the ferromagnetic material from interacting with printing materials and impart a high permeability to the piston. Certain piston embodiments may include a ferromagnetic portion, or be partially or entirely composed of a ferromagnetic material. Alternate piston embodiments may be of shapes other than a cylinder, such as rectangular, triangular, polyhedral, or combinations thereof.

Figure 5C:
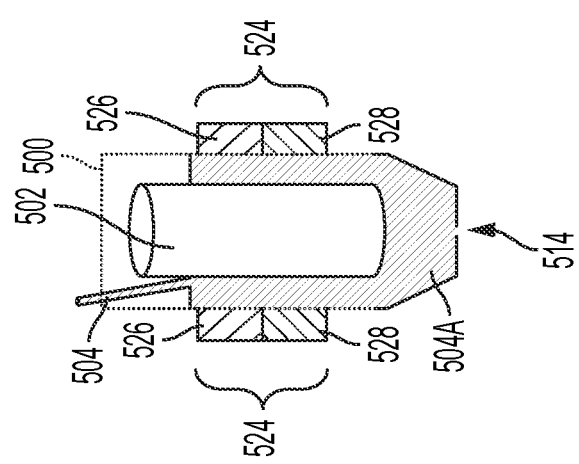

FIGS. 5A-5C are side cross-sectional views of several liquid ejectors, each having various solenoids, according to embodiments. A liquid ejector 500 includes a translating piston 502, a wire feed of printing material 504 with the molten liquid printing material 504A contained therein, and a nozzle or ejector orifice 514, similar to the embodiment shown in FIG. 2A. The liquid ejector 500 of FIG. 5A includes two segmented solenoids 506 wrapped at least partially around the body of the liquid ejector 500. Each segmented solenoid 506 further defines three solenoid coil segments, a first solenoid coil segment 508, a second solenoid coil segment 510, and a third solenoid coil segment 512. In the embodiment illustrated in FIG. 5A, the second solenoid coil segment 510 is larger than either the first solenoid coil segment 508 or the third solenoid coil segment 512, which are shown to be of similar size.

FIG. 5B shows a liquid ejector 500 having two segmented solenoids 516 wrapped at least partially around the body of the liquid ejector 500. Each segmented solenoid 516 further defines three solenoid coil segments, a first solenoid coil segment 518, a second solenoid coil segment 520, and a third solenoid coil segment 522. In the embodiment illustrated in FIG. 5B, the second solenoid coil segment 520 is approximately the same size as both the first solenoid coil segment 518, or the third solenoid coil segment 522, which are also shown to be of similar size.

FIG. 5C shows a liquid ejector 500 having two segmented solenoids 524 wrapped at least partially around the body of the liquid ejector 500. Each segmented solenoid 524 further defines two solenoid coil segments, a first solenoid coil segment 526 and a second solenoid coil segment 526. In the embodiment illustrated in FIG. 5C, the first solenoid coil segment 526 is approximately the same size as the second solenoid coil segment 526. According to certain embodiments, the relative numbers of solenoid coil segments and the relative sizes of the individual solenoid coil segments in the segmented solenoid may be varied depending on the desired printing material, printing system conditions, desired complexity of the switching circuit, or a combination thereof.

Figure 6A:
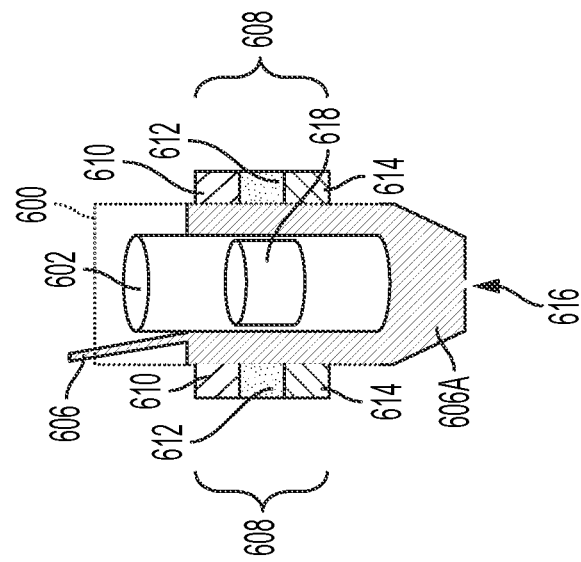
FIGS. 6A-6B are side cross-sectional views of a liquid ejector, illustrating various sizes of a piston core, according to embodiments.
Figure 6B:
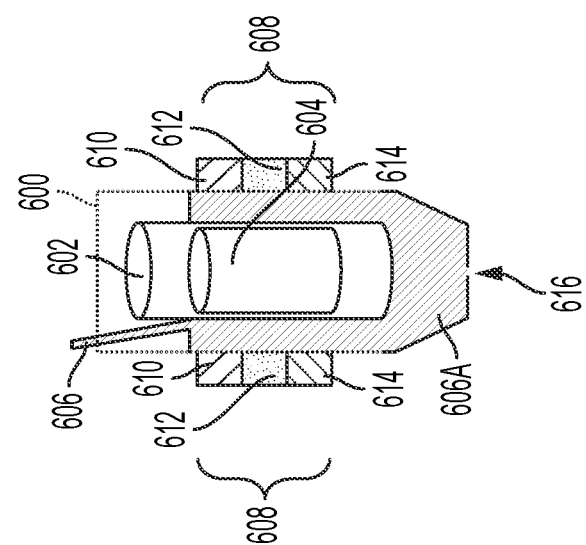

FIGS. 6A-6B are side cross-sectional views of a liquid ejector, illustrating various sizes of a piston core, according to embodiments. The liquid ejector 600 of FIGS. 6A and 6B defines an ejector body having a piston 602 which is capable of translational motion. A wire feed of printing material 606 enters the liquid ejector 600 for the purpose of introducing printing material into the body of the liquid ejector 600. The printing material 606 is melted in order to change the printing material 606 into a liquid printing material 606A, which is at a low enough viscosity to be ejected by the liquid ejector 600. The piston 602 also includes an internal ferromagnetic core 604, and the liquid ejector 600 further includes one or more segmented solenoids 608 wrapped at least partially around the liquid ejector 600. Each segmented solenoid 608 defines a first solenoid coil segment 610, a second solenoid coil segment 612, and a third solenoid coil segment 614, which interact with this internal ferromagnetic core 604 inside the piston 602. When the switching of the various segments 610, 612, 614 of the segmented solenoid 608 occurs in rapid succession, the piston 602 may move translationally towards and away from an ejector orifice 616 defined by the liquid ejector 600 and create a pulse within the body of the liquid ejector 600 in order to eject a droplet of liquid printing material 606A. FIG. 6B illustrates a similar embodiment of the liquid ejector 600 of FIG. 6A, but with a different sized, shorter length ferromagnetic core 618 inside the cylindrical piston 602. In certain embodiments, the use of a ferromagnetic core having a limited length may allow faster response by permitting high current to the switching coil. According to the following equation describing the inductance of a solenoid increases with a decreased length of the ferromagnetic core:

$$L = \mu_0 \mu_r N^2 A / l$$

Where L is inductance, $\mu 0$ is the magnetic constant, $\mu r$ is approximately 12,000 for Hiperco 50™ alloy, for example, N is the number of turns, A is the cross-sectional area, and l is the length. Therefore, if $\mu r > 10,000$, then inductance, and inductive impedance of the coil segment would increase dramatically. Low inductance for the outer switched coil segment(s) results in a faster response of the ferromagnetic core, and thus the movement of the cylindrical piston within the liquid ejector. Thus, the design of the ferromagnetic core, and the coil segments, involves trade-offs between force and inductance. In certain embodiments, the ferromagnetic portion of the piston or the ferromagnetic core, with or without additional magnetic pole pieces, the pulse frequency used in operation may be limited to undesirably low frequencies and/or excessive power supply voltages to be used in high-speed industrial metal jetting printer or other applications. To enable the use of lower-voltage power sources, capacitance in series with the coil could be added in such a manner that the capacitive impedance would counteract the inductive impedance. L-C circuit could be designed to operate at up to half of its self-resonant frequency using this method.

Figure 7:
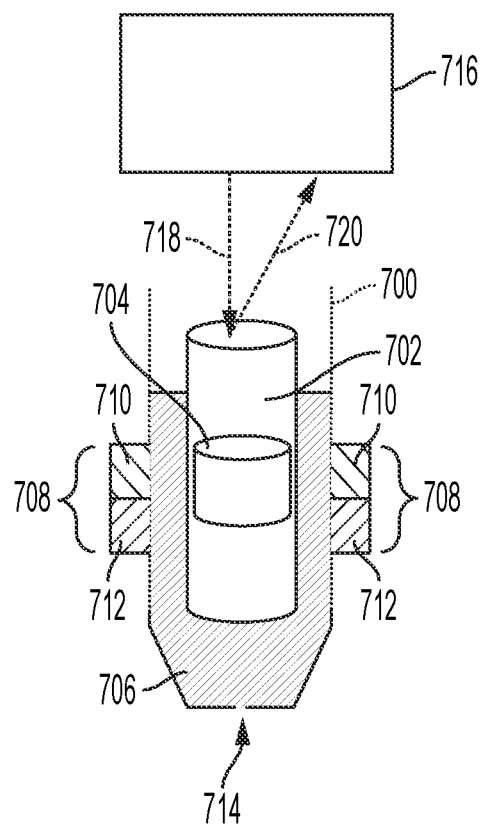
FIG. 7 is a displacement sensor for monitoring operation of a liquid ejector, according to an embodiment.

FIG. 7 is a displacement sensor for monitoring operation of a liquid ejector, according to an embodiment. The liquid ejector 700 of FIG. 7 defines an ejector body having a piston 702 which is capable of translational motion. A liquid printing material 706 is held within the body of the liquid ejector 700. The printing material 706 is at a low enough viscosity to be ejected by the liquid ejector 700. The piston 702 also includes an internal ferromagnetic core 704, and the liquid ejector 700 further includes one or more segmented solenoids 708 wrapped at least partially around the liquid ejector 700. Each segmented solenoid 708 defines a first solenoid coil segment 710 and a second solenoid coil segment 712, which interact with this internal ferromagnetic core 704 inside the piston 702. When the switching of the various segments 710, 712 of the segmented solenoid 708 occurs in rapid succession, the piston 702 may move translationally towards and away from an ejector orifice 714 defined by the liquid ejector 700 and create a pulse within the body of the liquid ejector 700 in order to eject a droplet of liquid printing material 706. FIG. 7 further illustrates a laser displacement sensor 716 which emits an outgoing laser beam 718 targeted at the top of the piston 702. The laser displacement sensor 716 also detects an incoming laser beam 720 reflected from the top of the piston 702. This laser displacement sensor 716 provides a measurement capability to monitor performance of the liquid ejector 700 during printing or testing events when the liquid ejector 700 is in operation.

Figure 8B:
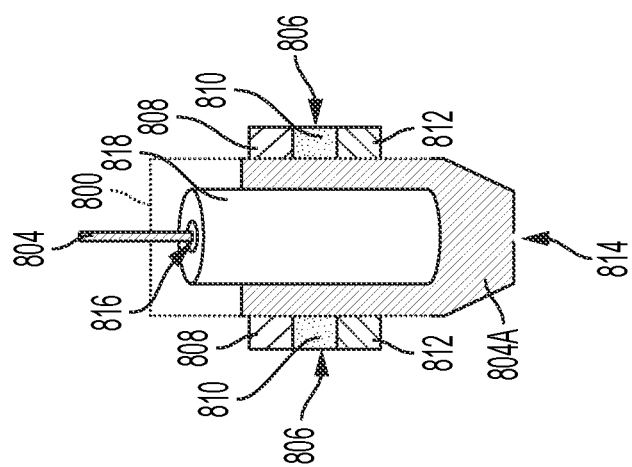
FIGS. 8A-8D are side cross-sectional views of a liquid ejector, each having various printing material feed and cylindrical piston configurations, according to embodiments.
Figure 8A:
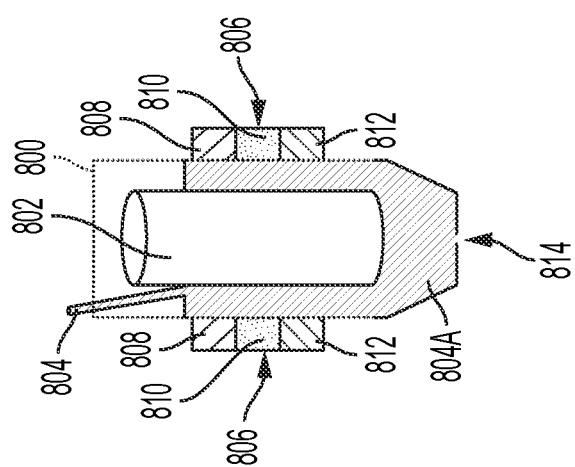
Figure 8D:
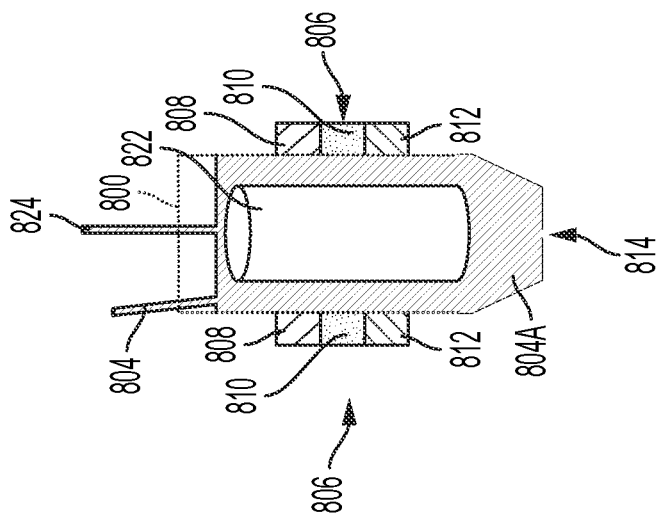
Figure 8C:
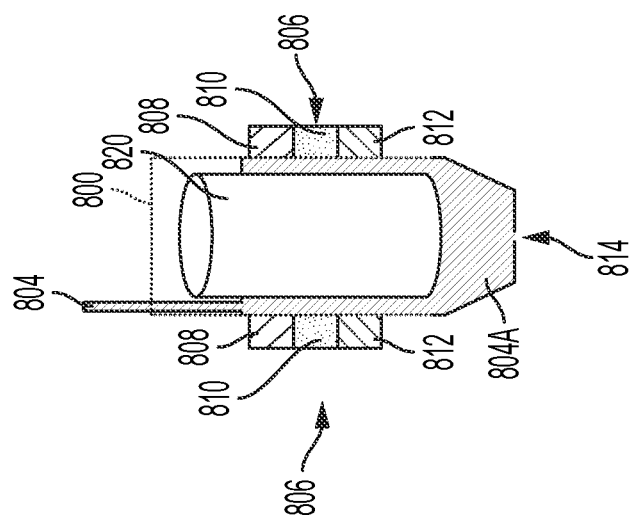

FIGS. 8A-8D are side cross-sectional views of a liquid ejector, each having various printing material feed and cylindrical piston configurations, according to embodiments. A liquid ejector 800 includes a translating piston 802, a wire feed of printing material 804 with the molten liquid printing material 804A contained therein, and a nozzle or ejector orifice 814, similar other embodiments shown and described herein. The liquid ejector 800 of FIGS. 8A-8C includes two segmented solenoids 806 wrapped at least partially around the body of the liquid ejector 800. Each segmented solenoid 806 further defines three solenoid coil segments, a first solenoid coil segment 808, a second solenoid coil segment 810, and a third solenoid coil segment 812. FIG. 8A illustrates an introduction of printing material 804 via a wire feed from an external location outside the liquid ejector 800 and into the internal cavity of the liquid ejector 800. FIG. 8B illustrates the printing material 804 being introduced into the liquid ejector 800 via a central bore 816 within a piston 818. It should be noted that the ferromagnetic core in this embodiment of a piston 818 would be configured to accommodate the central bore 816 by using a powdered or otherwise bored ferromagnetic core. FIG. 8C illustrates a larger diameter piston 820 as compared to other embodiments. FIG. 8D illustrates a dual feed of printing material, showing a first printing material 804 wire feed source and a secondary printing material wire feed source 824. The two feed sources result in a molten liquid printing material 804A upon heating. The first printing material 804 and the secondary printing material feed 824 are not necessarily of the same composition, as two sources of printing material may be mixed within the liquid ejector 800.

FIGS. 9A-9B are side cross-sectional views of a liquid ejector, each having various material heating configurations, according to embodiments. In certain embodiments, it may be necessary or desirable to heat a liquid ejector 900 near the nozzle or ejector orifice 914 externally in a location closer to the ejector orifice 914 on the body of the liquid ejector 900. Such a heating method or source may be primary heating source for the liquid ejector 900 or supplemental to another primary heating source. The liquid ejector 900 includes a translating piston 902, a wire feed of printing material 904 with the molten liquid printing material 904A contained therein, and a nozzle or ejector orifice 914, similar other embodiments shown and described herein. The liquid ejector 900 of FIGS. 9A-9B each include two segmented solenoids 906 wrapped at least partially around the body of the liquid ejector 900. Each segmented solenoid 906 further defines three solenoid coil segments, a first solenoid coil segment 908, a second solenoid coil segment 910, and a third solenoid coil segment 912. FIG. 9A illustrates an embodiment having one or more resistance heating elements 916 located adjacent to the ejector orifice 914 of the liquid ejector 900. FIG. 9B illustrates an embodiment having one or more high-frequency inductive heating elements 918, for example, fabricated using graphite, in order to provide heating to the liquid ejector 900 and therefore the liquid printing material 904A contained therein. While resistance heating sources or elements and high-frequency inductive heating elements or sources are shown and described herein, alternative sources may be utilized for primary or secondary heating.

According to certain embodiments, a method of ejecting liquid from an ejector such as described herein may include melting a printing material within an ejector or ejector body to form a liquid printing material and moving or translating the piston within the ejector towards an ejector orifice or away from an ejector orifice or nozzle. A first segment of a segmented solenoid wrapped partially around the ejector may be de-energized or switched off, while a second solenoid segment of a segmented solenoid wrapped partially around the ejector is energized or switched on. As the piston rapidly moves towards the ejector orifice, a drop of liquid printing material is ejected from the ejector nozzle or orifice.

As the first segment of the segmented solenoid is energized or switched on, and a second solenoid segment of a segmented solenoid is de-energized or switched off, the piston is then retracted away from the ejector nozzle. The method of ejecting liquid from an ejector may include feeding a printing material into the ejector. The printing material used in the method of ejecting liquid may include a metal, metallic alloy, or a combination thereof. The metal or metallic alloy may include silver, aluminum, brass, gold or combinations thereof.

The method of ejecting liquid from an ejector may include driving the segmented solenoid with a programmable pulse-width-modulator or measuring the location or condition of the piston by measuring a displacement of the piston with a laser displacement measurement device. The method of ejecting liquid from an ejector may include externally heating the ejector using a resistance heater or a high-frequency inductance heater, which may be at least partially wrapped around an ejector or a body of an ejector. The method of ejecting liquid from an ejector may include melting a printing material within an ejector to form a liquid printing material, actuating a segmented solenoid configured to interact with a piston held within the ejector, and thereby moving the piston towards an ejector nozzle defined by the ejector to eject a drop of liquid printing material from the ejector nozzle.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An ejector for a printing system, comprising:
an ejector body comprising:
an internal cavity; and
a nozzle in communication with the internal cavity;
one or more segmented solenoid coils wrapped at least partially around the ejector body;
a power source configured to supply one or more pulses of power to the one or more segmented solenoid coils, which cause one or more drops of the liquid to be jetted out of the nozzle; a heating element configured to heat a solid in the ejector, thereby causing the solid to change to a liquid within the ejector; wherein the one or more segmented solenoid coils comprise two or more segments capable of being energized or de-energized independently to cause bi-directional travel of the piston within the ejector; and
a piston comprising a ferromagnetic portion and a non-ferromagnetic portion disposed within the internal cavity of the ejector body; and
wherein the ferromagnetic portion comprises an alloy comprising cobalt and iron.

2. The ejector of claim 1, wherein the piston is cylindrical.

3. The ejector of claim 1, further comprising a core disposed within the piston, configured to interact with the one or more segmented solenoid coils.

4. The ejector of claim 1, wherein the one or more segmented solenoid coils comprise three segmented coils.

5. The ejector of claim 3, wherein the one or more segmented solenoid coils are configured to translate the piston towards the nozzle.

6. The ejector of claim 3, wherein the one or more segmented solenoid coils are configured to translate the piston away from the nozzle.

7. The ejector of claim 1, wherein the one or more segmented solenoid coils are configured to independently power on and/or power off.

8. The ejector of claim 1, wherein the ejector comprises no mechanical return mechanism.

9. The ejector of claim 1, wherein a diameter of the piston is smaller than a diameter of the internal cavity of the ejector body.

10. The ejector of claim 3, wherein a diameter of the core is smaller than the diameter of the piston.

11. The ejector of claim 3, wherein a length of the core is smaller than a length of the piston.

12. The ejector of claim 3, wherein the core further comprises a ferromagnetic material.

13. The ejector of claim 1, wherein the piston further comprises a surface coating of a continuous ceramic material disposed over an external surface of the piston.

14. The ejector of claim 13, wherein the piston further comprises an inert surface coating on the continuous ceramic material, wherein the surface coating is inert in contact with a printing material.

15. The ejector of claim 1, wherein the ejector comprises no seals or guides.

16. The ejector of claim 1, further comprising one or more magnetic pole pieces attached to an upper portion of the ejector body.

17. The ejector of claim 1, wherein the alloy in the ferromagnetic portion comprises $Co_{0.92}Fe_{0.8}$.

* * * * *